US007749655B2

(12) United States Patent
Doh et al.

(10) Patent No.: US 7,749,655 B2
(45) Date of Patent: Jul. 6, 2010

(54) ANODE ACTIVE MATERIAL FOR LITHIUM SECONDARY BATTERY AND MANUFACTURING METHOD THEREOF

(75) Inventors: Chil-Hoon Doh, Changwon-si (KR); Cheol-Wan Park, Masan-si (KR); Seong-In Moon, Changwon-si (KR); Bong-Soo Jin, Changwon-si (KR); Mun-Soo Yun, Changwon-si (KR); Kallaiselvi Nallathamby, Changwon-si (KR)

(73) Assignee: Korea Electro Technology Research Institute, Kyungsangnam-Do (KR)

( * ) Notice: Subject to any disclaimer, the term of this patent is extended or adjusted under 35 U.S.C. 154(b) by 1329 days.

(21) Appl. No.: 11/157,138

(22) Filed: Jun. 21, 2005

(65) Prior Publication Data
US 2005/0282070 A1    Dec. 22, 2005

(30) Foreign Application Priority Data
Jun. 21, 2004    (KR)    ............. 10-2004-0046055

(51) Int. Cl.
  *H01M 4/58*    (2010.01)
(52) U.S. Cl. ............. 429/218.1; 429/220; 429/221; 429/223; 429/247; 429/129
(58) Field of Classification Search ............. 429/218.1, 429/220, 221, 223, 247, 129
See application file for complete search history.

(56) References Cited

FOREIGN PATENT DOCUMENTS

JP    2002-246021    *    8/2002
JP    2004-319250    *    11/2004

OTHER PUBLICATIONS

Doh et al. "Synthesis and electrochemical characterization of novel high capacity Si3-xFexN4 anode for rechargeable lithium batteries", Electrochemistry Communications , 6 (10), (2004), pp. 965-968.*

* cited by examiner

*Primary Examiner*—Laura S Weiner
(74) *Attorney, Agent, or Firm*—Robert E. Bushnell, Esq.

(57) ABSTRACT

An anode active material for a lithium secondary battery, wherein a nitride compound containing silicon or metal such as copper, tin, germanium, indium and zinc is doped with second metal such as ferrum, cobalt, nickel and copper. To obtain the anode active material, a predetermined amount of metal nitride or silicon nitride is added to a second metal powder and then mixed uniformly. The mixture powder is filled into a container, and then a pressure is applied thereto to obtain a solid sample. The solid sample is heat-treated and pulverized into fine powder. The fine powder is heat-treated to obtain the metal nitride or the silicon nitride doped with the second metal.

18 Claims, 3 Drawing Sheets

ANODE ACTIVE MATERIAL FOR LITHIUM SECONDARY BATTERY AND MANUFACTURING METHOD THEREOF

CLAIM OF PRIORITY

This application makes reference to, incorporates the same herein, and claims all benefits accruing under 35 U.S.C. §119 from an application earlier filed in the Korean Intellectual Property Office on 21 Jun. 2004 and there duly assigned Serial No. 10-2004-0046055.

BACKGROUND OF THE INVENTION

1. Field of the Invention

The present invention relates to an anode active material for a lithium secondary battery and its manufacturing method, and more particularly to an anode active material for a lithium secondary battery and its manufacturing method that may improve an initial capacity and a reversible capacity by doping metal nitride or silicon nitride with a metal element such as Co and Fe.

2. Description of the Prior Art

At present, a lithium ion battery is widely used as a power source of mobile equipments, and attracts interests as a next-generation power source for an electric automobile. As the use of mobile equipments is abruptly increased, many devices with various functions desired by users are unceasingly developed, so that energy consumption of these mobile devices is also increased.

The lithium ion battery has an anode made of graphite, a cathode made of lithium transition metal oxide, a separator, and an organic solvent electrolyte in which lithium ions are dissociated. In order to develop a lithium ion battery with high energy, a material that has higher energy density than an existing electrode material should be used.

Studies for anode active materials are briefly classified into oxides, suicides, lithium alloys, and nitrides. Study for oxides is mainly focused on elements with 3d orbit, representatively cobalt (Co) oxides (CoO, $Co_3O_4$) and ferrum (Fe) oxides (a-$Fe_2O_3$). When Si and Sn are reacted with lithium, an irreversible lithium oxide ($Li_2O$) is generated, while it is reported that the cobalt oxides are reversible oxides. Study for suicides uses ternary alloy reaction between metal silicide and lithium, representatively magnesium silicide ($Mg_2Si$) and nickel silicide (NiSi). Such suicides show behavior similar to graphite, but they show serious lattice distortion according to complexity of the alloying process. Si and Sn representatively use a binary alloy reaction of metal and lithium. In particular, silicon, when being made into an alloy in the form of $Li_{4.4}Si$ by reaction with lithium ions, has a theoretical capacity density of 4,200 mAh/g, which is higher than that of graphite, 370 mAh/g, and silicon also shows charging/discharging voltage behavior similar to graphite. However, they are not commercially used yet due to problems such as repeated contraction/expansion of lithium silicide ($Li_xSi$) in charging/discharging and resultant poor electric contact between active material and a collector, like silicides. Study for nitrides is mainly focused on the ternary system using lithium nitride ($Li_3N$) and the binary system such as tin, zinc and copper nitrides. If lithium nitride is doped with cobalt, an irreversible capacity is hardly generated at an initial cycle and a constant capacity of 800 mAh/g is obtained. However, there are many difficulties in commercializing them, since lithium nitrides show high reactivity with atmosphere and sensitivity with moisture. Study for tin, zinc and copper nitrides is mainly focused on electrodes in a flat film shape.

In spite of many studies for various materials as mentioned above, commercialization is not yet realized due to various problems. In particular, nitrides are not commercialized in view of economical efficiency for installation and facility costs due to reactivity with atmosphere and moisture despite of their excellent features.

SUMMARY OF THE INVENTION

It is therefore an object of the present invention to provide a novel anode active material for a lithium secondary battery.

It is another object of the present invention to provide a method for manufacturing an anode active material for a lithium secondary battery.

It is also an object of the present invention to solve the problems of the prior art.

It is a further object of the present invention to provide an anode active material for a lithium secondary battery and its manufacturing method that may improve an initial capacity and a reversible capacity by doping a silicon nitride with a metal element such as Co and Fe rather than a pure silicon nitride.

It is yet another object of the present invention to provide an anode active material for a lithium secondary battery and its manufacturing method that may be used under a general atmospheric condition and have advantages of both silicon and nitride.

In order to accomplish the above object, the present invention provides an anode active material for a lithium secondary battery, including a nitride compound doped with second metal, the nitride compound including silicon or first metal.

In another aspect of the invention, there is also provided a lithium ion battery, including a cathode, an anode comprising a nitride compound doped with second metal, the nitride compound including silicon or first metal, a separator interposed between the cathode and the anode, and an electrolyte.

In another aspect of the invention, there is also provided a method for manufacturing an anode active material for a lithium secondary battery, the method including: adding a nitride compound to second metal and then mixing them uniformly to form a mixture powder, the nitride compound containing silicon or a first metal; filling the mixture powder into a container and applying a predetermined pressure to the mixture powder to obtain a solid sample; first heat-treating the solid sample; pulverizing the first heat-treated solid sample into fine powder; and second heat-treating the fine powder to obtain the silicon nitride or the metal nitride doped with second metal.

It is preferred that the nitride compound including the silicon or the first metal selected from the group consisting of copper, tin, germanium, indium and zinc, and the second metal is selected from the group consisting of ferrum, cobalt, nickel and copper.

It is preferred that the anode active material is $Si_{4.5}FeN_6$ or $Si_{4.5}CoN_6$.

BRIEF DESCRIPTION OF THE DRAWINGS

A more complete appreciation of the present invention, and many of the above and other features and advantages of the present invention, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENT

Figure 1:
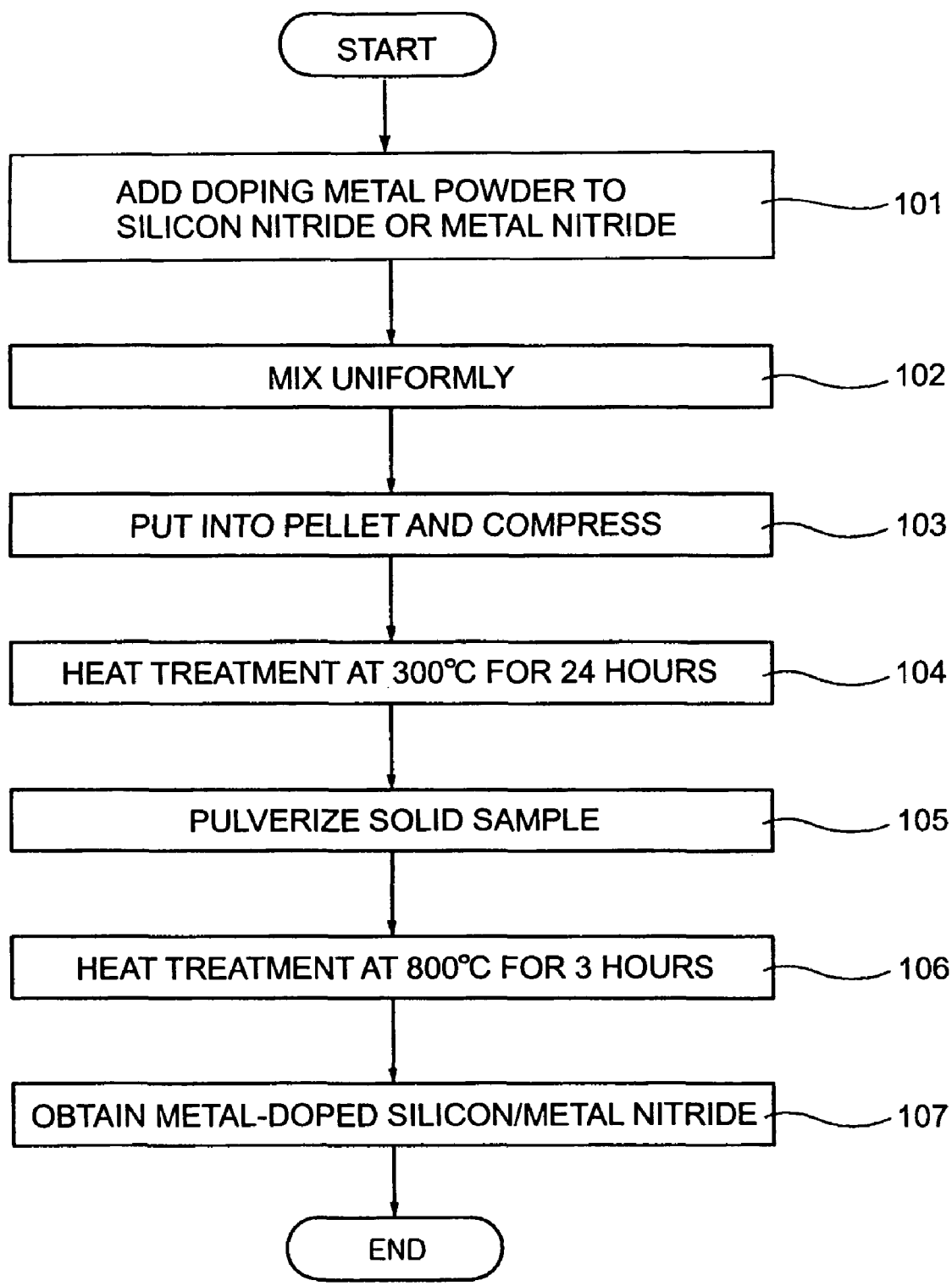
FIG. 1 is a flowchart for illustrating a method for manufacturing an anode active material for a lithium secondary battery according to an embodiment of the present invention.

Hereinafter, the present invention will be described in more detail referring to the drawings.

FIG. 1 is a flowchart for illustrating a method for manufacturing an anode active material for a lithium secondary battery according to an embodiment of the present invention.

Referring to FIG. 1, the method for manufacturing an anode active material for a lithium secondary battery according to an embodiment of the present invention manufactures silicon nitride or metal nitride doped with metal (hereinafter referred to as "second metal"), which is different from the metal (hereinafter referred to as "first metal") of the metal nitride, as an anode active material for a lithium secondary battery. That is to say, a small amount of metal nitride or silicon nitride having a fine diameter (e.g., an average diameter of sub-micrometer unit) is added with the second metal powder (preferably Fe or Co powder), and then uniformly mixed (101, 102). For example, 6 moles of silicon nitride is added with 4 moles of metal powder and then uniformly mixed. Here, the metal nitride may include nitrides of such as copper, tin, germanium, indium and zinc. In addition, the second metal used for doping may include nickel and copper, Fe and Co. It is preferred that the second metal is Fe or Co.

If the mixture powder is obtained as mentioned above, the mixture powder is filled in a container (a pellet with a diameter of 3.5 cm), and then a predetermined pressure (preferably 25 MPa) is applied thereto (103). At this time, such a pressure is applied two or three times repeatedly. By repeatedly applying the pressure as mentioned above, a bonding force among elements is improved, thereby facilitating their composition.

After a solid sample is obtained through the pressure-applying process, a first heat treatment is conducted to the sample for a predetermined time (104). For example, the first heat treatment for the sample is conducted in a furnace filled with an inert gas (preferably nitrogen gas) for 24 hours at 300° C.

If the first heat treatment is completed as mentioned above, the heat-treated solid sample is pulverized into fine powder (105). After that, a second heat treatment is conducted to the obtained powder at a predetermined temperature for a predetermined time to obtain metal nitride or silicon nitride doped with the second metal (106 and 107). For example, the second heat treatment is conducted to the powdered sample for 3 hours at 800° C. to finally obtain the metal nitride or the silicon nitride doped with the second metal.

Figure 2:
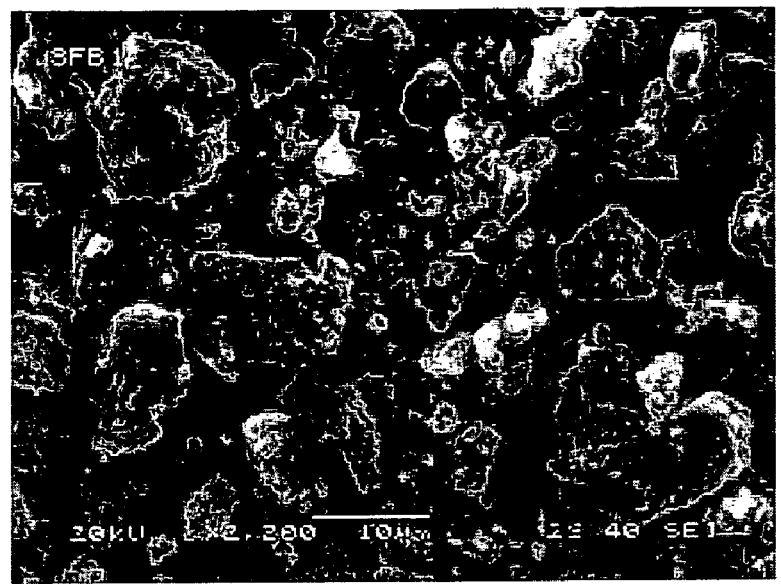
FIG. 2 is a SEM (Scanning Electron Microscope) photograph of $Si_{4.5}FeN_6$, silicon nitride doped with Fe, which acts as an anode active material for a lithium secondary battery according to an embodiment of the present invention.
Figure 3:
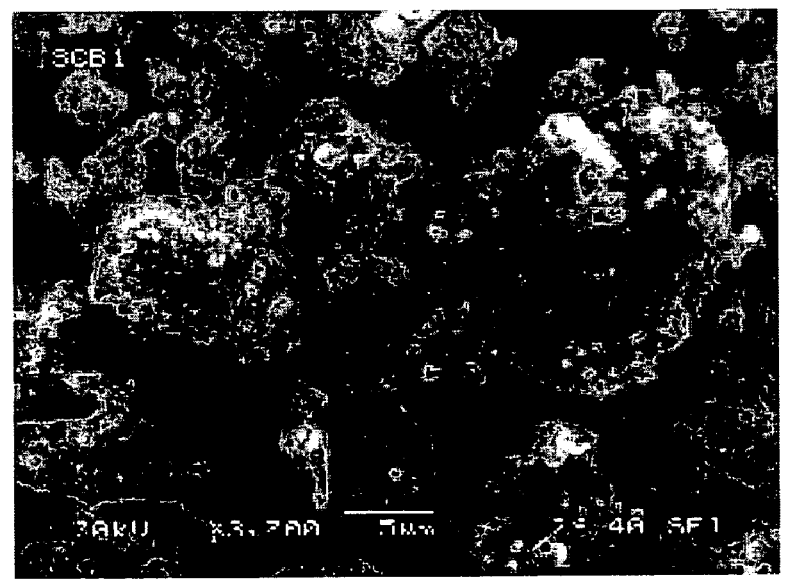
FIG. 3 is a SEM photograph of $Si_{4.5}CoN_6$, silicon nitride doped with Co, which acts as an anode active material for a lithium secondary battery according to an embodiment of the present invention.

FIGS. 2 and 3 show the metal-doped silicon nitride obtained as mentioned above. FIG. 2 is a SEM (Scanning Electron Microscope) photograph of $Si_{4.5}FeN_6$, silicon nitride doped with Fe, and FIG. 3 is a SEM photograph of $Si_{4.5}CoN_6$, silicon nitride doped with Co.

In order to evaluate a life feature of a half-cell that adopts a silicon nitride doped with Co or Fe as an anode active material for a lithium secondary battery according to the embodiment of the present invention, the following experiment was performed.

For the experiment, an electrode was firstly prepared with the use of an anode active material of a metal-doped silicon nitride made by the method of the present invention, a conductive material (Super P carbon black, produced by MMM S. A. Carbon, Brussels, Belgium) and a binder (poly(vinylidene fluoride) produced by Sigma-Aldrich Co.). That is to say, the above materials were made into a slurry at a volume ratio of 80:10:10, then cast on a copper foil collector, and then made into an electrode plate of a predetermined size (e.g., a rectangular electrode plate of 3 cm×5 cm in width and length) through the drying and compressing processes.

A lithium metal (produced by Bosung Metal Industrial Co., Ltd.) and a separator (produced by Asahi Kasei Kogyo Kabushiki Kaisha (Osaka, JP)) used as basic electrodes were used without special purification, and an electrolyte (produced by Cheil Industries Inc.) was composed of 1 mol of lithium hexafluoride added to a mixture solution having a volume ratio 1:1 of ethylene carbonate and diethyl carbonate. The anode, the separator and the lithium electrode prepared as mentioned above were laminated in the order of anode/separator/lithium electrode to make a half-cell. In addition, a capacity test was conducted to the half-cell at a constant current density.

Figure 4:
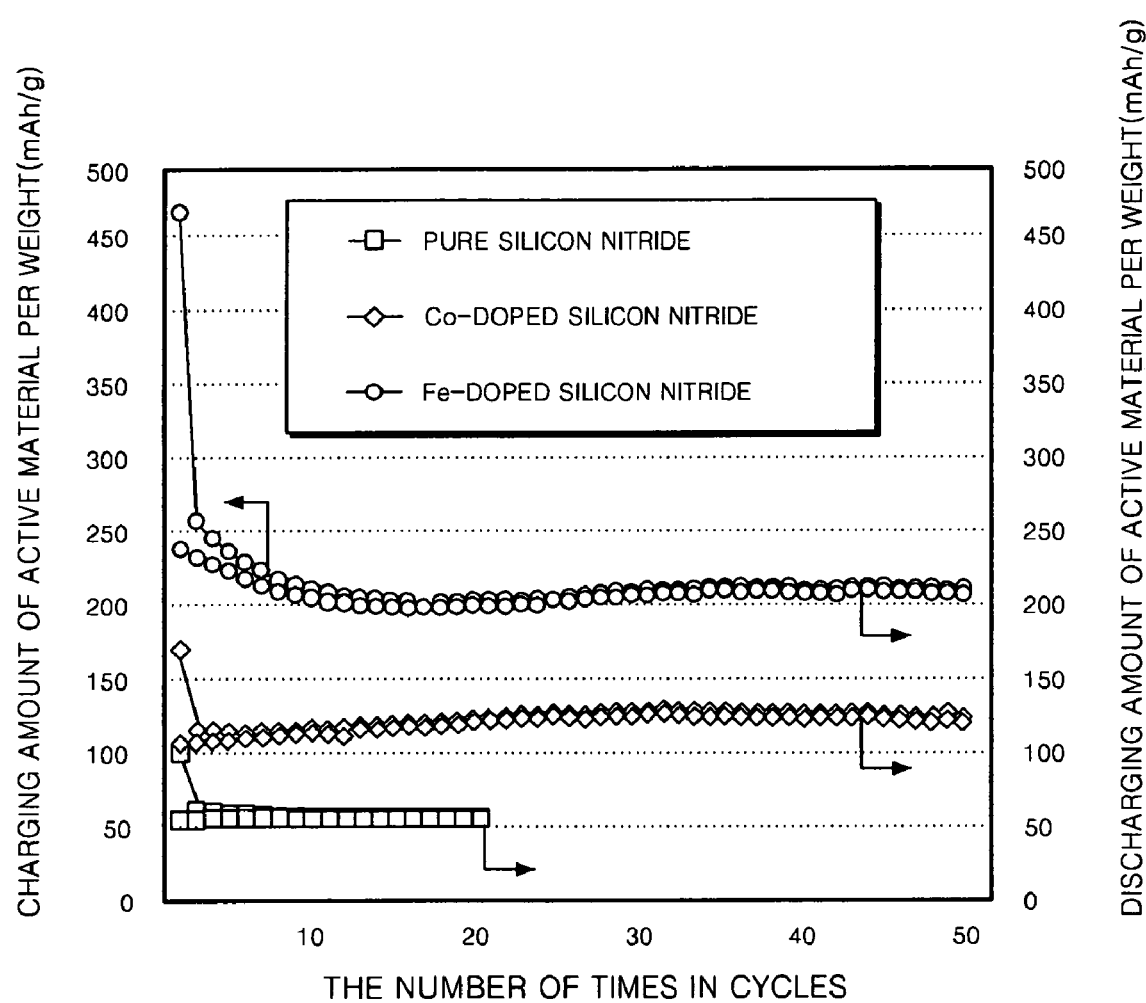
FIG. 4 is a graph showing a life according to a constant current density for half-cells, each of which adopts a pure silicon nitride and a silicon nitride doped with Co or Fe as an anode active material.

FIG. 4 is a graph showing a life according to a constant current density for half-cells, each of which adopts a pure silicon nitride and a silicon nitride doped with Co or Fe as an anode active material.

Here, a constant current density of 0.13 mA per an electrode area (cm$^2$) was applied, and cut-off was executed at 0 and 3.3V by potential control for charging/discharging.

Referring to FIG. 4, an initial capacity and a reversible capacity of the half-cell that adopts the silicon nitride doped with Co or Fe as an anode active material according to the present invention are remarkably increased in comparison to the half-cell adopting a pure silicon nitride as an anode active material. If the silicon nitride is doped with Co, an initial Coulomb efficiency is improved, while the reversible capacity is improved when doped with Fe. The experimental results may be more clearly understood with the following table 1.

Table 1

| Anode alive material | First cycle | | | 20$^{th}$ cycle | | |
|---|---|---|---|---|---|---|
| | Charging capacity (mAh/g) | Discharging capacity (mAh/g) | Coulomb efficiency (%) | Charging capacity (mAh/g) | Discharging capacity (mAh/g) | Coulomb efficiency (%) |
| Pure silicon nitride | 98 | 52 | 53.06 | 56 | 55 | 98.21 |

Table 1-continued

| Anode alive material | First cycle | | | 20th cycle | | |
|---|---|---|---|---|---|---|
| | Charging capacity (mAh/g) | Discharging capacity (mAh/g) | Coulomb efficiency (%) | Charging capacity (mAh/g) | Discharging capacity (mAh/g) | Coulomb efficiency (%) |
| $Si_{45}CoN_6$ | 170 | 105 | 61.76 | 122 | 120 | 98.36 |
| $Si_{45}FeN_6$ | 470 | 237 | 50.42 | 203 | 200 | 98.52 |

As shown in FIG. 4 and Table 1, the anode active material of the metal-doped silicon nitride produced by the present invention shows much better features than the pure silicon nitride in view of increase of an initial capacity, improvement of Coulomb efficiency, and increase of a reversible capacity range.

As described above, the anode active material for lithium secondary battery and its manufacturing method according to the present invention may improve an initial capacity, a reversible capacity and a Coulomb efficiency, compared with a pure silicon nitride, by doping the silicon nitride or the metal nitride with a metal element such as Fe and Co. In addition, the present invention may improve work efficiency, since the anode active material of the present invention may be manufactured at an atmospheric condition differently from existing lithium nitrides.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. An anode active material for a lithium secondary battery, comprising:
   a nitride compound including silicon doped with second metal.

2. The anode active material according to claim 1, wherein the second metal is selected from the group consisting of ferrum, cobalt, nickel, and copper.

3. The anode active material of claim 2, wherein the second metal is ferrum or cobalt.

4. A lithium ion battery comprising the anode active material of claim 1.

5. A lithium ion battery, comprising:
   a cathode;
   an anode comprising an anode active material, the anode active material comprising a nitride compound including doped with second metal;
   a separator interposed between the cathode and the anode; and
   an electrolyte.

6. The lithium ion battery according to claim 5, wherein the second metal is selected from the group consisting of ferrum, cobalt, nickel and copper.

7. The lithium ion battery of claim 6, wherein the second metal is ferrum or cobalt.

8. The lithium ion battery according to claim 5, wherein the anode active material is $Si_{4.5}FeN_6$ or $Si_{4.5}CoN_6$.

9. A method for manufacturing an anode active material for a lithium secondary battery, the method comprising:
   adding a nitride compound including silicon to second metal and mixing them uniformly to form a mixture powder,
   filling the mixture powder into a container and applying pressure to the mixture powder to obtain a solid sample;
   first heat-treating the solid sample;
   pulverizing the first heat-treated solid sample into fine powder; and
   second heat-treating the floe powder to obtain metal nitride doped with second metal.

10. The method according to claim 9, wherein the second metal is selected from the group consisting of ferrum, cobalt, nickel and copper.

11. The method of claim 10, wherein the second metal is ferrum or cobalt.

12. The method according to claim 9, wherein the nitride compound has an average diameter of sub-micrometer unit.

13. The method according to claim 9, wherein the pressure is 25 MPa.

14. The method according to claim 9, wherein the pressure of 25 MPa is repeatedly applied two or three times.

15. The method according to claim 9, wherein the first heat treatment is conducted within a furnace filled with nitrogen gas at 300° C. for 24 hours.

16. The method according to claim 9, wherein the second heat treatment thermally treats the fine powder at 800° C. for 3 hours.

17. The anode active material manufactured by the method of claim 9.

18. A lithium ion battery comprising the anode active material of claim 17.

* * * * *